United States Patent [19]
Sloan et al.

[11] 4,126,331
[45] Nov. 21, 1978

[54] FOLDABLE STROLLER

[75] Inventors: James L. Sloan, Avon; Greg W. Meeker, Rochester, both of N.Y.

[73] Assignee: Cross River Products, Inc., Rochester, N.Y.

[21] Appl. No.: 804,780

[22] Filed: Jun. 8, 1977

[51] Int. Cl.² ............................................. B62B 11/00
[52] U.S. Cl. .................................. 280/650; 280/642
[58] Field of Search ............... 280/650, 642, 647, 658; 296/1 B; 297/58, 378

[56] References Cited
U.S. PATENT DOCUMENTS

| | | | |
|---|---|---|---|
| 2,823,043 | 2/1958 | Shone | 280/650 |
| 3,917,302 | 11/1975 | Gebhard | 280/650 |
| 4,032,173 | 6/1977 | Clegg | 280/650 |
| 4,042,274 | 8/1977 | Cabagnero | 280/650 |

Primary Examiner—Joseph F. Peters, Jr.
Assistant Examiner—Donn McGiehan
Attorney, Agent, or Firm—Cumpston & Shaw

[57] ABSTRACT

A stroller for children movable between a compact folded position and an erect position for receiving and supporting a child. The stroller comprises a handle portion, a front wheel support portion and a rear wheel support portion. The handle portion has a handle at one end, and the front wheel support portion has front wheels rotatably supported at one end. The opposite end of each of the handle and front wheel support portions comprise a pair of spaced apart elongated handle and front members respectively which are hingeably connected together. The rear wheel support portion has rear wheels rotatably supported at one end and a slide member hingeably connected to each of a pair of spaced apart elongated rear members at its opposite end. Each slide member is further slideably mounted on a handle member of the handle portion and movable thereon from a retracted position to an extended position. In the retracted position, the handle and front wheel support portions are free to pivot relative to one another for folding the stroller into a compact folded position. In the extended position, the slide member slidably engages the front wheel support portion for securing the handle and front wheel support portions together in non-pivotal relation for supporting the stroller in its erect position. The slide member connections between the handle and rear members further allows pivotal movement of the rear wheel support portion relative to the handle and front portions to provide a more compact folded position for the stroller.

11 Claims, 10 Drawing Figures

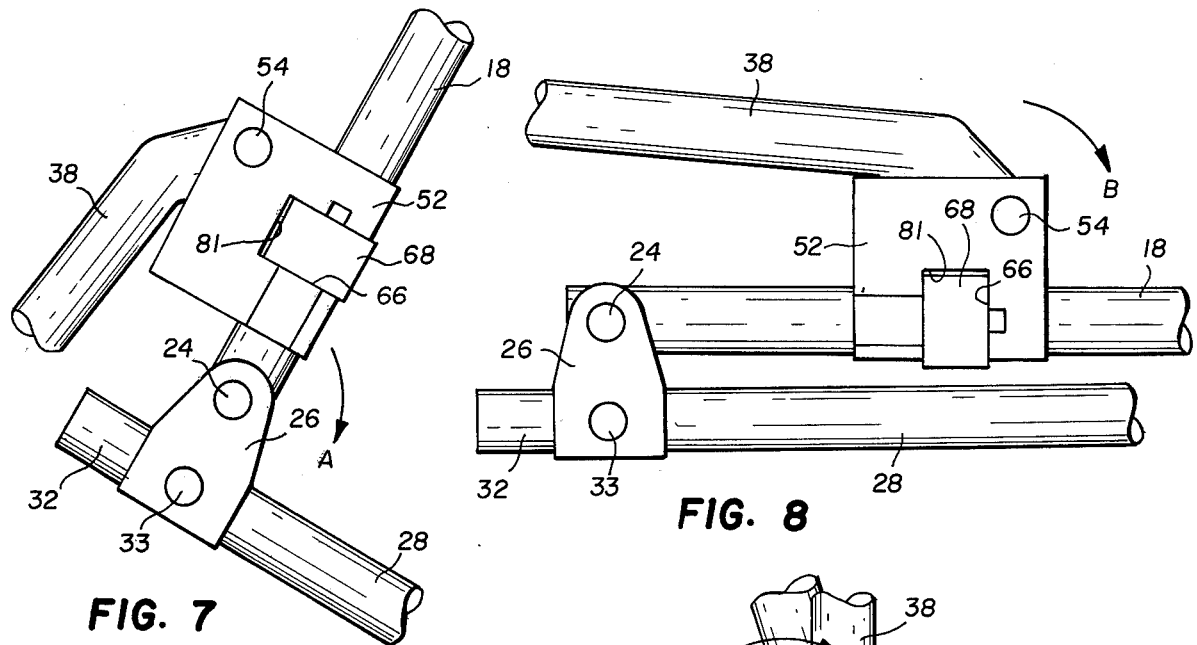
FIG. 7
FIG. 8
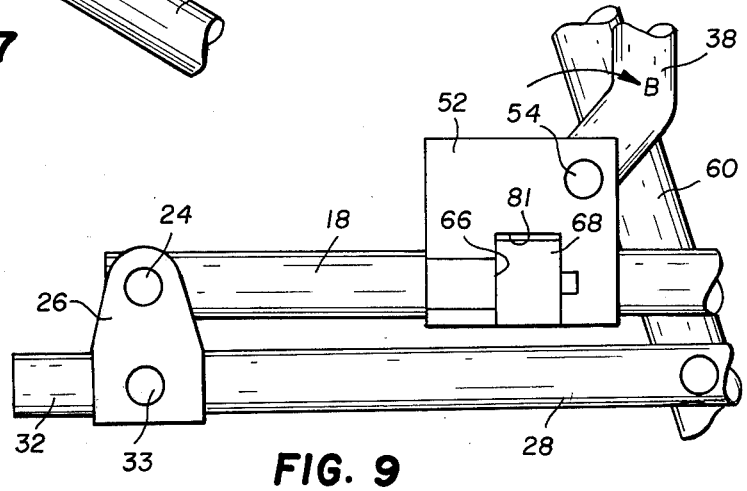
FIG. 9
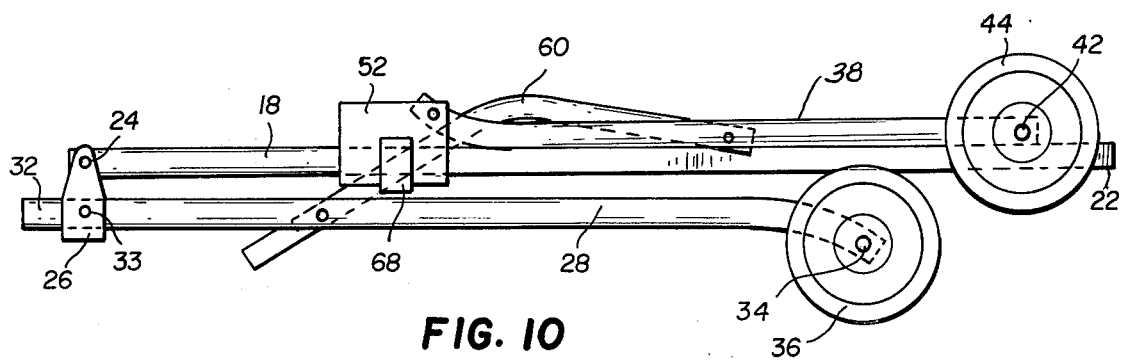
FIG. 10

FOLDABLE STROLLER

BACKGROUND OF THE INVENTION

1. Statement of the Invention

This invention relates generally to strollers, and more specifically to an improved foldable stroller.

2. Description of the Prior Art

Foldable strollers movable between a compact folded position for storage and portability, and an erect position for receiving and supporting a child are generally well known in the art. Although such strollers generally operate satisfactorily, some of them suffer from the disadvantage of having a large number of movable parts which increase the cost of the stroller, and decrease the compactness of the stroller in its folded position. In addition, some of the strollers are prone to accidently collapse while a child is seated therein resulting in fractured or lacerated hands and fingers, and sometimes death to the child, particularly where hinged levers move together in scissor-like fashion. Applicant's inventive stroller is believed to obviate these and other disadvantages of the prior known strollers.

SUMMARY OF THE INVENTION

In accordance with a preferred embodiment of the invention, a stroller for children is disclosed which is movable between a compact folded position for storage and portability, and an erect position for receiving and supporting a child. The stroller comprises hingeably interconnected handle means, front wheel support means, and rear wheel support means. The handle means comprises a pair of spaced apart elongated handle members having a handle at one end. The front wheel support means comprises a pair of spaced apart elongated front members having front wheels rotatably supported at one end. The opposite ends of the handle and front members are hingeably connected together. The rear wheel support means comprises a pair of spaced apart elongated rear members rotatably supporting rear wheels at one end, and having slide means hingeably connected to their opposite end. The slide means are further slideably mounted on a complementary handle member of the handle means and movable between retracted and extended positions. In the retracted position, the slide means is disengaged from the front members, and the handle and front wheel support members are free to pivot relative to one another to allow folding the stroller into its folded position. During the folding operation, movement of the slide means on the handle member allows pivotal movement of the rear wheel support members relative to the handle and front wheel support members to provide a more compact folded position for the stroller. In the extended position of the slide means, the slide means engages the front members for securing the handle and front members together in non-pivotal relation for supporting the stroller in its erect position. The stroller further has cross members hingeably interconnecting the front and rear members for rigidly supporting the rear wheel support member in the erect position of the stroller.

In another aspect of the invention, the slide means comprises a slide member having a first opening therethrough for slidably receiving a handle member of the handle means. The slide member further has a second opening parallel to the first opening for slidably receiving the end of a front member when the slide member is manually slid on the front member to its extended position.

In a more specific aspect of the invention, the stroller is provided with positive lock means for locking the slide member in its extended position to prevent accidental collapse of the stroller. The lock means comprises a rotatable member captured by the slide member and movable between locked and unlocked positions. The rotatable member has a third opening in alignment with the first opening, and grooves along the inner periphery of the first and third openings which when aligned slidably receive a projection on the handle member. When the projection has passed through the grooves upon slidable movement of the slide member on the handle member to its extended position, the rotatable member is rotated to its locked position. In this position, a shoulder on the rotatable member is interposed in the path of the projection for positively preventing slidable movement of the slide member on the handle member to its retracted position for releasing the front member.

The primary advantages, among others, of this improved stroller are its increased safety provisions due to a lockable slide member, its reduced cost of manufacture due to a reduced number of parts, and its increased compactness in its folded position.

The invention and these and other advantages will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 7 is a segmental side elevational view similar to FIG 6 showing the position of the stroller with the handle members pivoted clockwise relative to the front members through an angle of approximately 90°.

FIG. 8 is a segmental side elevational view similar to FIG. 7 showing the position of the stroller with the handle members pivoted clockwise relative to the front members through an angle of approximately 90° from its FIG. 7 position and resting on the front members;

FIG. 9 is a segmental side elevational view of the stroller showing the rear members pivoted clockwise relative to the handle and front members through an angle of approximately 90° from its position illustrated in FIG. 8; and FIG. 10 is a side elevational view of the stroller in its compact folded position with the rear members rotated counter clockwise through an angle of approximately 90° from the position illustrated in FIG. 9 and resting on the handle members.

DESCRIPTION OF THE PREFERRED EMBODIMENT

Figure 1:
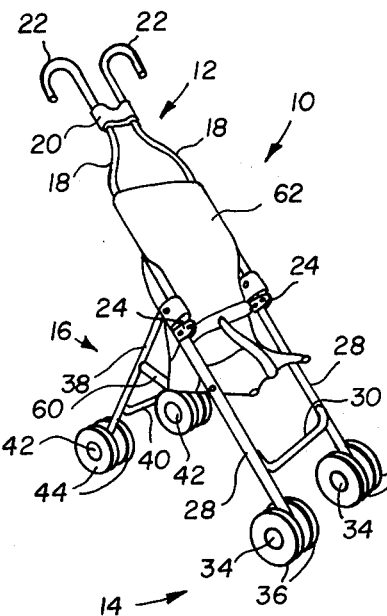
FIG. 1 is a perspective view of a preferred embodiment of the stroller of this invention in its erect position.
Figure 2:
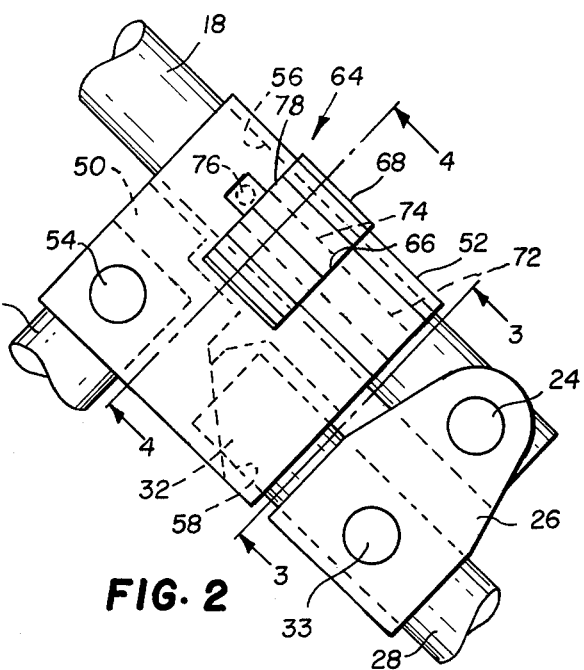
FIG. 2 is an enlarged segmental side elevational view of the slide member of FIG. 1.
Figure 3:
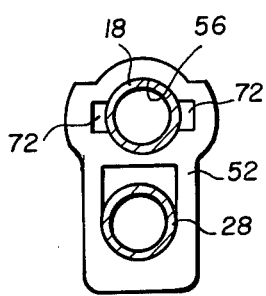
FIG. 3 is an enlarged section view taken substantially along line 3—3 of FIG. 2.
Figure 4:
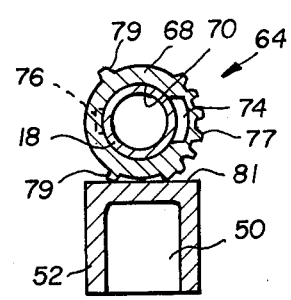
FIG. 4 is an enlarged section view taken substantially along line 4—4 of FIG. 2.

With reference to FIGS. 1 and 2, a preferred embodiment of the stroller 10 of this invention is illustrated in its erect position for receiving and supporting a child. The stroller 10 comprises handle means 12, front wheel support means 14 and rear wheel support means 16 hingeably interconnected together. The handle means 12 comprises a pair of spaced apart tubular elongated handle members 18 secured together in substantially parallel relation by a cross member 20 riveted thereto. Each handle member 18 has a curved umbrella type handle 22 at one end, and its opposite end hingeably connected by a hinge pin 24 to a U-shaped hinge member 26. The front wheel support means 14 comprises a pair of tubular elongated front members 28 secured together in spaced apart parallel relation by a cross member 30 riveted to members 28. One of the ends 32 of each front member 28 is securely riveted by hinge pin 33 to a complementary hinge member 26 for hingeably connecting the handle and front members 18, 28 respectively together. A stub shaft 34 is journaled through the opposite end of each front member 28 for rotatably supporting a pair of front wheels 36. The aforementioned ends 32 of members 28 extend a short distance through hinge members 26 for a purpose to be explained hereinafter.

The rear wheel support means 16 comprises a pair of elongated tubular rear members 38, only one of which is visible, secured together in spaced parallel relation by a cross member 40 riveted to the members. Each rear member 38 has a stub shaft 42 journaled through one end for rotatably supporting a pair of rear wheels 44 mounted thereon. At least one of the rear members 38 further has a U-shaped bracket, not shown, riveted to member 38 adjacent rear wheels 44 for pivotally supporting a brake lever, not shown, adapted when pressed by the operator's foot to brake the wheels in a manner well known in the art. The opposite end of each rear member 38 extends into a U-shaped recess 50 in a slide member 52 and is hingeably connected thereto by a hinge pin 54. Each slide member 52 has a first elongated opening 56 extending therethrough for slidably receiving an end of handle member 18. Each slide member 52 further has a second opening 58 parallel to first opening 56 for slidably receiving end 32 of front member 28 when the slide member is manually slid on handle member 18 to an extended position as seen in FIGS. 1 and 2. In this extended position, the handle and front members 18, 28 respectively are rigidly secured together in non-pivotal relation for supporting stroller 10 in its erect position. In this erect position of the stroller, the hingeably mounted rear members 38 are rigidly positioned by a pair of cross members 60 FIGS. 1 and 10), each of which has one end hingeably connected to rear member 38 and its opposite end hingeably connected to a front member 28. The cross members 60 further support one end of a cloth seat 62, the opposite end of which is secured to handle members 18 by rivets or the like.

With slide members 52 in their extended positions for rigidly supporting stroller 10 in its erect position, the likelihood of accidental collapse of the stroller is remote. To collapse the stroller, it is necessary to slide slide members 52 upwardly along handle members 18 which necessitate pivoting rear members 38 causing the rear wheels 44 to move toward the front wheels 36. This is difficult to do since the weight of the child produces a force tending to hold slide members 52 in their extended positions. However, if the slide members are inadvertently retracted and stroller 10 collapses, injury to the child is unlikely since handle means 12 merely pivots forwardly over the child causing cloth seat 62 to cover the child.

As best seen in FIGS. 2–5 to prevent possible accidental collapse of the erect stroller, lock means 64 are disclosed on each slide member 52 for positively locking the slide member in its extended position and stroller 10 in its rigid erect position. Since lock means 64 are identical, only one will be described in detail. The lock means 64 comprises a U-shaped notch 66 in slide member 52 transverse to and extending through first opening 56 in the member. A rotatable lock member 68 nests within notch 66 and has a third opening 70 extending therethrough in alignment with first opening 56. Accordingly, when slide and lock members 52, 68 respectively slidably receive handle member 18, the lock member 68 is held captive within slide member notch 66 and is free to rotate on handle member 18 between locked and unlocked positions. Slide and lock members 52, 68 respectively are provided with elongated grooves 72, 74 respectively on the inner periphery of openings 56, 70. When lock member 68 is in its unlocked position (FIG. 5), the grooves 72, 74 are in alignment for receiving a projection 76 on handle member 18 when slide members 52 is manually slid along the handle member to its extended position. While slide member 52 is in this extended position, lock member 68 is manually rotated by toothed finger grip 77 to its locked position (FIG. 4) in which groove 74 is out of alignment with projection 76 and an end surface 78 on lock member 68 surrounding handle member 18 is interposed in the path of the projection. The end surface 78 positively prevents slidable movement of slide member 52 on handle member 18 to its retracted position, thereby retaining the handle and front members 18, 28 respectively rigidly secured together in non-pivotal relation. A detent comprising a lug 79 cooperates with lower surface 81 to releasably hold lock member 68 in its locked and unlocked positions.

Figure 5:
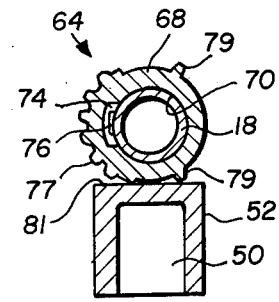
FIG. 5 is an enlarged section view taken substantially along line 5—5 of FIG. 6.
Figure 6:
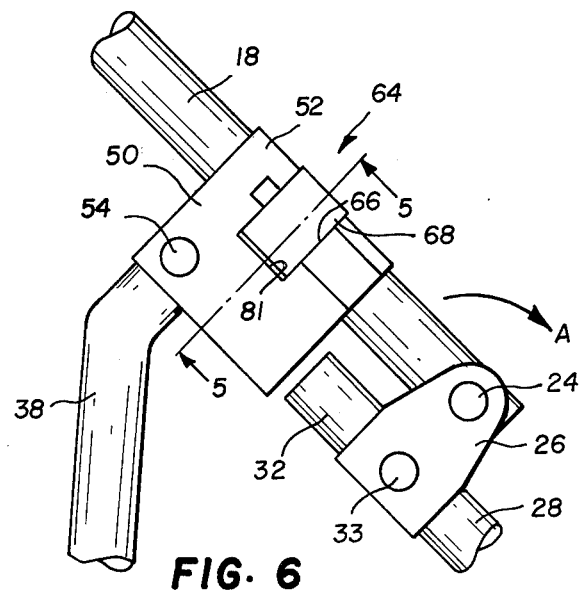
FIG. 6 is a segmental side elevational view of the stroller of FIG. 1 showing the slide member in its unlocked and retracted position in which the handle and front members are free to pivot relative to one another.

With reference to FIGS. 6–10, various positions of stroller 10 are illustrated as the stroller is successively moved from its erect position in FIG. 1. to its compact folded position in FIG. 10. Initially, lock members 68 are rotated to their unlocked positions (FIG. 5). The slide members 52 are manually slid along handle members 18 to their retracted positions illustrated in FIG. 6 wherein the slide members are disengaged from front members 28. The handle members 18 are then manually pivoted as a unit in a clockwise direction indicated by arrow A about hinge pins 24 through an angle of substantially 180° as illustrated in FIGS. 7 and 8 until handle members 18 rest on front members 28. The rear members 38 are then manually pivoted as a unit in a clockwise direction indicated by arrow B about hinge pins 54 through approximately 180° as illustrated in FIGS. 9 and 10 until rear members 38 rest on handle members 18. In this position, the ends of the umbrella handles 22 are received between rear wheels 44.

Pivotal movement of rear members 38 as a unit to the folded position illustrated in FIG. 10 is possible because slide members 52 are free to slide along handle members 18 as the rear members are pivoted, resulting in a more compact stroller in its folded position.

The stroller 10 can be latched in this compact folded position by any suitable latch such as a strap having one end secured to handle cross member 20 and its opposite end adapted to be wrapped around rear cross member 40 and then snapped by any suitable detent to the handle cross member.

The invention has been described in detail with particular reference to a preferred embodiment, but it will be understood that variations and modifications can be effected within the spirit and scope of the invention as described hereinabove.

What is claimed is:

1. A foldable stroller for children movable between a compact folded position and an erect position for receiving and supporting a child comprising:
   (a) handle means having a handle at one end of said handle means and having a handle member at its opposite end;
   (b) front wheel support means for rotatably supporting front wheels at one end of said front wheel support means and having a front member at its opposite end hingeably connected to said handle member;
   (c) rear wheel support means for rotatably supporting rear wheels at one end of said rear wheel support means and having a rear member at its opposite end;
   (d) slide means hingeably connected to said rear member and slidably mounted on said handle member, said slide means being slidably movable on said handle member between a retracted position in which said slide means is disengaged from said front member to allow pivotal movement of said handle means relative to said front wheel support means for folding the stroller into its compact folded position, and an extended position in which said slide means engages said front member for preventing pivotal movement of said handle means relative to said front wheel support means and for supporting the stroller in its erect position for receiving and supporting a child; and
   (e) means hingeably interconnecting said front wheel support means to said rear wheel support means for rigidly supporting said rear wheel support means in the erect position of the stroller.

2. The stroller of claim 1 wherein said interconnecting means comprises a cross member, said stroller further comprising a child receiving seat secured adjacent one end to said cross member and adjacent its opposite end to said handle member.

3. The stroller of claim 1 wherein the opposite end of said handle means comprises a pair of spaced apart, elongated handle members, the opposite end of said front wheel support means comprises a pair of spaced apart, elongated front members, and said slide means comprises a pair of block members, each having a first opening therethrough for slidably receiving a corresponding one of said handle members.

4. The stroller of claim 3 wherein said block member has a second opening substantially parallel to said first opening for slidably receiving a corresponding one of said front members in said extended position of said slide means.

5. The stroller of claim 4 and further comprising lock means for locking said slide means in said extended position.

6. The stroller of claim 5 wherein said handle members are tubular, said lock means comprises a rotatable lock member captured by said block member and movable between locked and unlocked positions, and having a third opening in alignment with said first opening for slidably receiving a corresponding one of said handle members, a projection on said handle member, and grooves in said lock member and said block member along the inner periphery of said first and third openings respectively, said grooves adapted to be in alignment when said lock member is in its unlocked position for slidably receiving said projection upon movement of said slide means to its extended position, said lock member adapted when said slide means is in its extended position to be rotated on said handle member to its locked position interposing a shoulder in the path of said projection for positively preventing slidable movement of said slide means to its retracted position.

7. A stroller for children movable between a compact folded position and an erect position for receiving and supporting a child comprising:
   (a) handle means having a handle at one end and a pair of spaced apart, elongated handle members at the opposite end;
   (b) front wheel support means comprising a pair of spaced apart, elongated front members, a front wheel rotatably mounted at one end of each of said front members, and hinge means for connecting the opposite end of each of said front members to one of said handle members;
   (c) rear wheel support means comprising a pair of spaced apart, elongated rear members, and a rear wheel rotatably mounted at one end of each of said rear members;
   (d) slide means hingeably connected to the opposite end of each of said rear members, each of said slide means further being slidably mounted on one of said handle members and movable between a retracted position in which said slide means is disengaged from said front member to allow said handle and front members to be folded relative to one another, and an extended position in which said slide means engages said front member and rigidly couples said handle and front members together for supporting the stroller in its erect position; and
   (e) a pair of cross members, each cross member having one end hingeably connected to said front member and its opposite end hingeably connected to said rear member for rigidly supporting said rear wheel support means in the erect position of the stroller.

8. The stroller of claim 7 and further comprising a child receiving seat secured adjacent one end to said pair of cross members and adjacent its opposite end to said pair of handle members.

9. The stroller of claim 8 wherein each of said slide means comprises a block member having a first opening extending therethrough for slidably receiving a corresponding handle member, and a second opening for slidably receiving said opposite end of a corresponding front member in said extended position of said slide means for rigidly securing said handle and front members together in non-pivotal relation for supporting the stroller in said erect position.

10. The stroller of claim 9 and further comprising lock means on each of said block members for locking said slide means in its extended position.

11. The stroller of claim 10 wherein said handle members are tubular, said lock means on each of said block members comprises a notch in said block member transverse to and extending through said first opening, a rotatable lock member seated in said notch and having a third opening in alignment with said first opening for slidably receiving a corresponding handle member, said lock member being rotatable on said handle member between locked and unlocked positions, a projection on said handle member, and first and second longitudinal grooves in said block and lock member respectively along the inner periphery of said first and third openings respectively, said first and second grooves adapted to be in alignment when said lock member is in its unlocked position for slidably receiving said projection upon movement of said slide means to its extended position, said lock members having a shoulder and adapted when said slide means is in its extended position to interpose said shoulder in the path of said projection when said lock members is rotated to its locked position for preventing movement of said slide means to its retracted position whereby the stroller is locked in its erect position.

* * * * *